United States Patent
Dave et al.

(10) Patent No.: US 11,304,212 B2
(45) Date of Patent: Apr. 12, 2022

(54) TARGET TRANSMISSION TIME BASED TRANSMIT SCHEDULING

(71) Applicant: Apple Inc., Cupertino, CA (US)

(72) Inventors: Brajesh K. Dave, Cupertino, CA (US);
Guoqing Li, Cupertino, CA (US);
Shehla S. Rana, San Jose, CA (US);
Yang Yu, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/936,292

(22) Filed: Jul. 22, 2020

(65) Prior Publication Data

US 2021/0282158 A1    Sep. 9, 2021

Related U.S. Application Data

(60) Provisional application No. 62/886,743, filed on Aug. 14, 2019.

(51) Int. Cl.
*H04W 72/12* (2009.01)
*H04L 47/56* (2022.01)
*H04L 47/34* (2022.01)

(52) U.S. Cl.
CPC ............ *H04W 72/12* (2013.01); *H04L 47/34* (2013.01); *H04L 47/56* (2013.01)

(58) Field of Classification Search
CPC ....... H04L 1/0018; H04L 69/28; H04L 69/30; H04L 69/32; H04L 69/321; H04L 69/323; H04L 69/324; H04L 69/329; H04W 28/0273; H04W 80/00; H04W 80/02; H04W 80/08; H04W 80/12; H04W 84/12
See application file for complete search history.

(56) References Cited

U.S. PATENT DOCUMENTS

| | | | |
|---|---|---|---|
| 8,780,740 B2 | 7/2014 | Baik et al. | |
| 8,971,259 B2 | 3/2015 | Teague et al. | |
| 10,270,564 B2 | 4/2019 | Djukic et al. | |
| 2002/0054578 A1* | 5/2002 | Zhang | H04L 1/0001 370/328 |
| 2006/0064464 A1* | 3/2006 | Kakivaya | H04L 1/1848 709/206 |
| 2011/0019685 A1 | 1/2011 | Diab et al. | |
| 2013/0294379 A1* | 11/2013 | Guo | H04W 72/087 370/329 |

(Continued)

*Primary Examiner* — Kan Yuen

(74) *Attorney, Agent, or Firm* — Kowert, Hood, Munyon, Rankin & Goetzel, P.C.

(57) ABSTRACT

Methods for scheduling data packets based on a target transmission time may include receiving, from an application layer at a first time, a data packet and an associated latency requirement. The first layer may determine based, at least in part, on the associated latency requirement, a target transmission time. The target transmission time may be a sum of a queuing delay, an expected transmit completion time, and the first time. The data packet may be queued (or scheduled for transmission) based, at least in part, on the target transmission time and an access category assigned to the data packet. The data packet may be transmitted (or scheduled for transmission) from the queue according to the target transmission time. The expected transmit completion time may be a sum of an average contention time for the access category assigned to the data packet and estimated airtime.

20 Claims, 8 Drawing Sheets

(56) References Cited

U.S. PATENT DOCUMENTS

| | | | |
|---|---|---|---|
| 2015/0078460 A1* | 3/2015 | Hu | H04N 19/67 375/240.27 |
| 2016/0128079 A1* | 5/2016 | Verma | H04L 47/50 370/329 |
| 2017/0149674 A1* | 5/2017 | Verma | H04L 47/12 |
| 2018/0049130 A1* | 2/2018 | Huang | H04W 56/001 |

* cited by examiner

TARGET TRANSMISSION TIME BASED TRANSMIT SCHEDULING

PRIORITY DATA

This application claims benefit of priority to U.S. Provisional Application Ser. No. 62/886,743, titled "Target Transmission Time Based Transmit Scheduling", filed Aug. 14, 2019, which is hereby incorporated by reference in its entirety as though fully and completely set forth herein.

FIELD

The present application relates to wireless communications, including techniques for wireless communication among wireless stations in a wireless networking system, including target transmission time based transmit scheduling.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

SUMMARY

Embodiments described herein relate to target transmission time based transmit scheduling.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, a wireless station may include multiple layers and may be configured to receive, at a first time and at a first layer, a data packet and an associated latency requirement of the data packet from an upper layer. The first layer may determine based, at least in part, on the associated latency requirement, a target transmission time. The target transmission time may be a sum of a queuing delay, an expected transmit completion time, and the first time. The data packet may be queued (or scheduled for transmission) (at a second layer of the wireless station) based, at least in part, on the target transmission time and an access category assigned to the data packet. The data packet may be transmitted (or scheduled for transmission) from the queue according to the target transmission time. In some embodiments, the target transmission time may be defined as a time when the data packet must be delivered over the access medium to meet the associated latency requirement. In some embodiments, the expected transmit completion time may be a sum of an average contention time for the access category assigned to the data packet and estimated airtime. In some embodiments, the estimated airtime may be a product of packet size of the data and a recent physical layer rate. In some embodiments, the recent physical layer rate may be a weighted linear combination of a most recently assigned physical layer rate and a moving average for previously assigned physical layer rates.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1A:
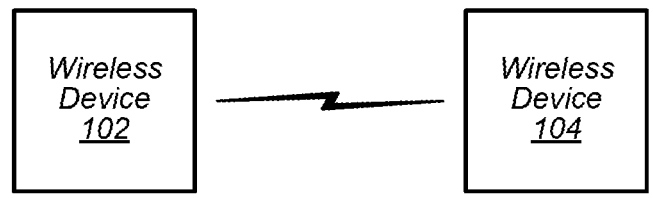
FIG. 1A illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
TX: Transmission/Transmit
RX: Reception/Receive
LAN: Local Area Network
WLAN: Wireless LAN
RAT: Radio Access Technology Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
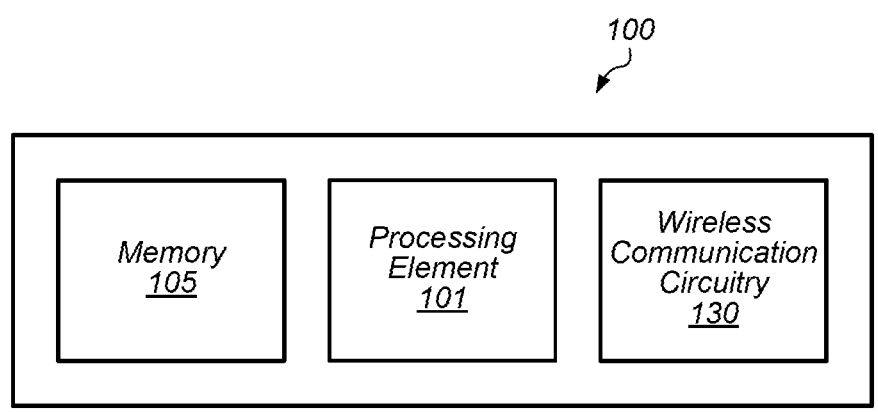
FIG. 1B illustrates an example simplified block diagram of a wireless device, according to some embodiments.

FIGS. 1A-1B—Wireless Communication System

FIG. 1A illustrates an exemplary (and simplified) wireless communication system in which aspects of this disclosure may be implemented. It is noted that the system of FIG. 1A is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, hand-held device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1A. For example, a wireless device (e.g., either of wireless devices 102 or 104) may perform error recovery for a ranging procedure. Thus, in some embodiments, the wireless device may be configured to receive, at a first time and at a first layer, a data packet and an associated latency requirement of the data packet from an upper layer. The first layer may determine based, at least in part, on the associated latency requirement, a target transmission time. The target transmission time may be a sum of a queuing delay, an expected transmit completion time, and the first time. The data packet may be queued (or scheduled for transmission) (at a second layer of the wireless station) based, at least in part, on the target transmission time and an access category assigned to the data packet. The data packet may be transmitted (or scheduled for transmission) from the queue according to the target transmission time. In some embodiments, the target transmission time may be defined as a time when the data packet must be delivered over the access medium to meet the associated latency requirement. In some embodiments, the expected transmit completion time may be a sum of an average contention time for the access category assigned to the data packet and estimated airtime. In some embodiments, the estimated airtime may be a product of packet size of the data and a recent physical layer rate. In some embodiments, the recent physical layer rate may be a weighted linear combination of a most recently assigned physical layer rate and a moving average for previously assigned physical layer rates.

FIG. 1B illustrates an exemplary wireless device 100 (e.g., corresponding to wireless devices 102 and/or 104) that may be configured for use in conjunction with various aspects of the present disclosure. The device 100 may be any of a variety of types of device and may be configured to perform any of a variety of types of functionality. The device 100 may be a substantially portable device or may be a substantially stationary device, potentially including any of a variety of types of device. The device 100 may be configured to perform one or more ranging wireless communication techniques or features, such as any of the techniques or features illustrated and/or described subsequently herein with respect to any or all of the Figures.

As shown, the device 100 may include a processing element 10. The processing element may include or be coupled to one or more memory elements. For example, the device 100 may include one or more memory media (e.g., memory 105), which may include any of a variety of types of memory and may serve any of a variety of functions. For example, memory 105 could be RAM serving as a system memory for processing element 101. Other types and functions are also possible.

Additionally, the device 100 may include wireless communication circuitry 130. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 130 may include its own processing element (e.g., a baseband processor), e.g., in addition to the processing element 101. For example, the processing element 101 may be an 'application processor' whose primary function may be to support application layer operations in the device 100, while the wireless communication circuitry 130 may be a 'baseband processor' whose primary function may be to support baseband layer operations (e.g., to facilitate wireless communication between the device 100 and other devices) in the device 100. In other words, in some cases the device 100 may include multiple processing elements (e.g., may be a multi-processor device). Other configurations (e.g., instead of or in addition to an application processor/baseband processor configuration) utilizing a multi-processor architecture are also possible.

The device 100 may additionally include any of a variety of other components (not shown) for implementing device functionality, depending on the intended functionality of the device 100, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 100, such as processing element 101, memory 105, and wireless communication circuitry 130, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 101, peripheral interfaces for communication with peripheral components within or external to device 100, etc.) may also be provided as part of device 100.

Figure 1C:
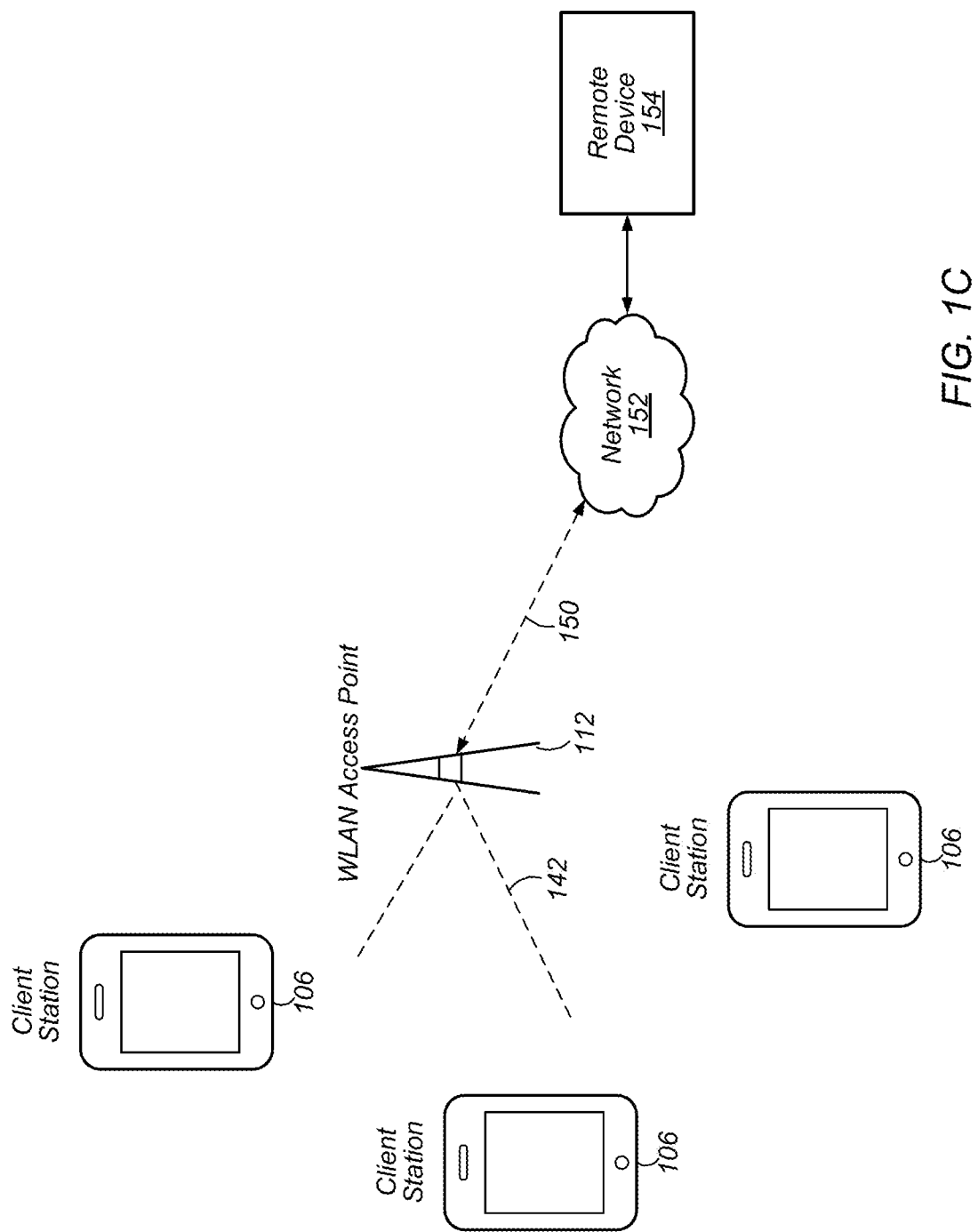
FIG. 1C illustrates an example WLAN communication system, according to some embodiments.

FIG. 1C—WLAN System

FIG. 1C illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, as further described below, a wireless device 106 (which may be an exemplary implementation of device 100) may be configured to receive, at a first time and at a first layer, a data packet and an associated latency requirement of the data packet from an upper layer. The first layer may determine based, at least in part, on the associated latency requirement, a target transmission time. The target transmission time may be a sum of a queuing delay, an expected transmit completion time, and the first time. The data packet may be queued (or scheduled for transmission) (at a second layer of the wireless station) based, at least in part, on the target transmission time and an access category assigned to the data packet. The data packet may be transmitted (or scheduled for transmission) from the queue according to the target transmission time. In some embodiments, the target transmission time may be defined as a time when the data packet must be delivered over the access medium to meet the associated latency requirement. In some embodiments, the expected transmit completion time may be a sum of an average contention time for the access category assigned to the data packet and estimated airtime. In some embodiments, the estimated airtime may be a product of packet size of the data and a recent physical layer rate. In some embodiments, the recent physical layer rate may be a weighted linear combination of a most recently assigned physical layer rate and a moving average for previously assigned physical layer rates.

Figure 2:
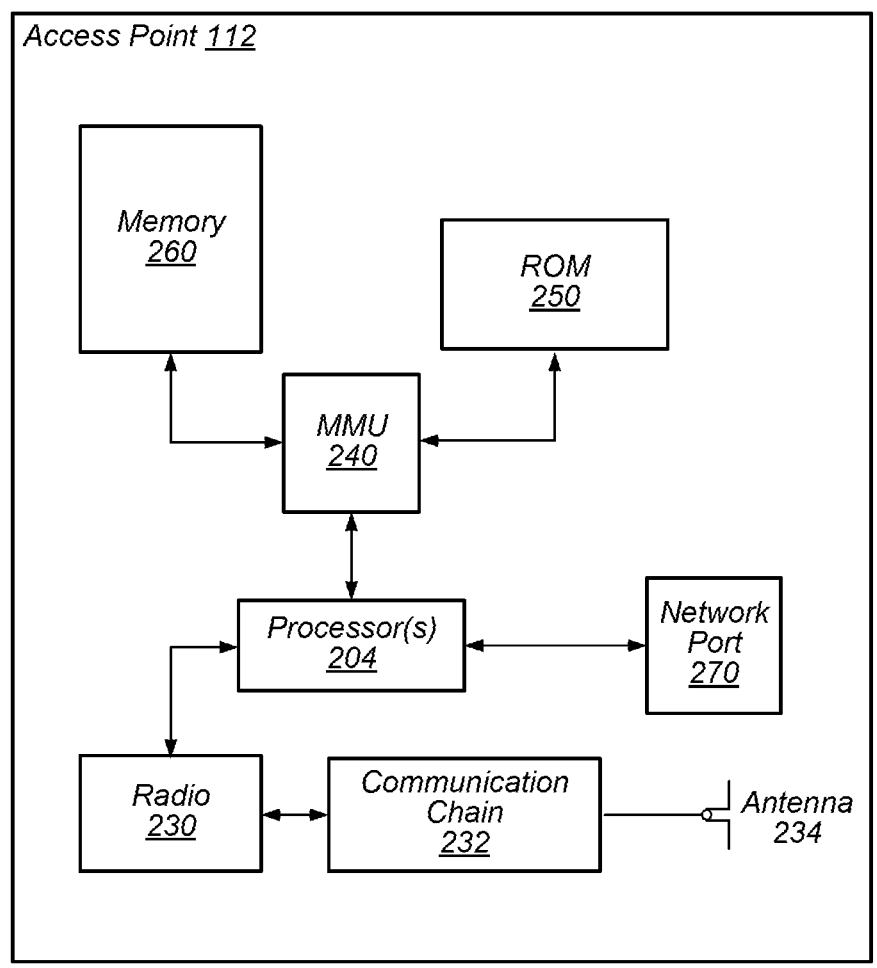
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112, which may be one possible exemplary implementation of the device 100 illustrated in FIG. 1B. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to perform error recovery for a ranging procedure. Thus, in some embodiments, the AP 112 may be configured to receive, at a first time and at a first layer, a data packet and an associated latency requirement of the data packet from an upper layer. The first layer may determine based, at least in part, on the associated latency requirement, a target transmission time. The target transmission time may be a sum of a queuing delay, an expected transmit completion time, and the first time. The data packet may be queued (or scheduled for transmission) (at a second layer of the wireless station) based, at least in part, on the target transmission time and an access category assigned to the data packet. The data packet may be transmitted (or scheduled for transmission) from the queue according to the target transmission time. In some embodiments, the target transmission time may be defined as a time when the data packet must be delivered over the access medium to meet the associated latency requirement. In some embodiments, the expected transmit completion time may be a sum of an average contention time for the access category assigned to the data packet and estimated airtime. In some embodiments, the estimated airtime may be a product of packet size of the data and a recent physical layer rate. In some embodiments, the recent physical layer rate may be a weighted linear combination of a most recently assigned physical layer rate and a moving average for previously assigned physical layer rates.

Figure 3A:
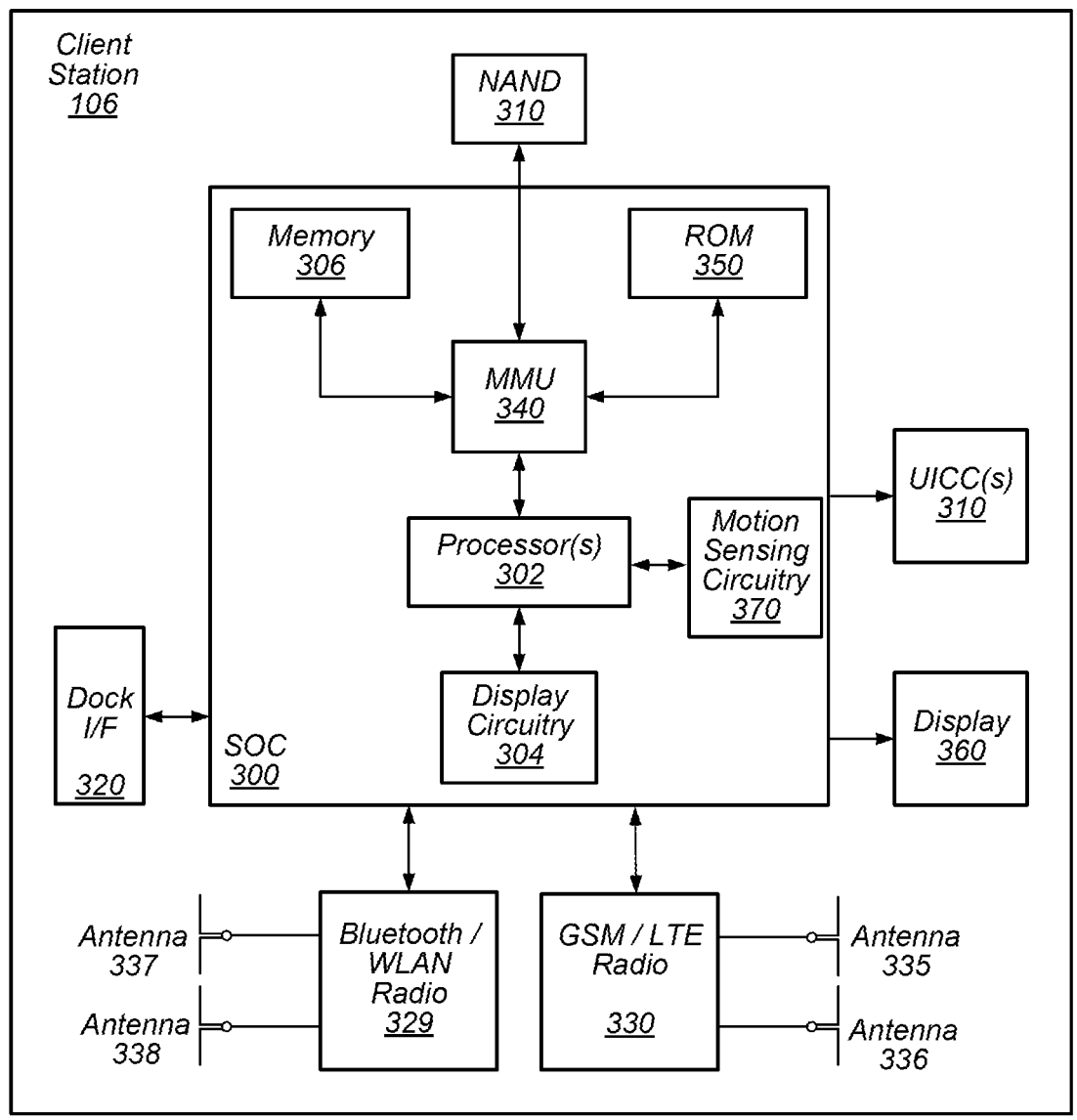
FIG. 3A illustrates an example simplified block diagram of a wireless station (UE), according to some embodiments.

FIG. 3A—Client Station Block Diagram

FIG. 3A illustrates an example simplified block diagram of a client station 106, which may be one possible exemplary implementation of the device 100 illustrated in FIG. 1B. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration. Some or all components of the short to medium range wireless communication circuitry 329 and/or the cellular communication circuitry 330 may be used for ranging communications, e.g., using WLAN, Bluetooth, and/or cellular communications.

As shown, the SOC 300 may include processor(s) 302, which may execute program instructions for the client station 106 and display circuitry 304, which may perform graphics processing and provide display signals to the display 360. The SOC 300 may also include motion sensing circuitry 370 which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1C or for ranging as shown in FIG. 1A. Further, in some embodiments, as further described below, client station 106 may be configured to receive, at a first time and at a first layer, a data packet and an associated latency requirement of the data packet from an upper layer. The first layer may determine based, at least in part, on the associated latency requirement, a target transmission time. The target transmission time may be a sum of a queuing delay, an expected transmit completion time, and the first time. The data packet may be queued (or scheduled for transmission) (at a second layer of the wireless station) based, at least in part, on the target transmission time and an access category assigned to the data packet. The data packet may be transmitted (or scheduled for transmission) from the queue according to the target transmission time. In some embodiments, the target transmission time may be defined as a time when the data packet must be delivered over the access medium to meet the associated latency requirement. In some embodiments, the expected transmit completion time may be a sum of an average contention time for the access category assigned to the data packet and estimated airtime. In some embodiments, the estimated airtime may be a product of packet size of the data and a recent physical layer rate. In some embodiments, the recent physical layer rate may be a weighted linear combination of a most recently assigned physical layer rate and a moving average for previously assigned physical layer rates.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Figure 3B:
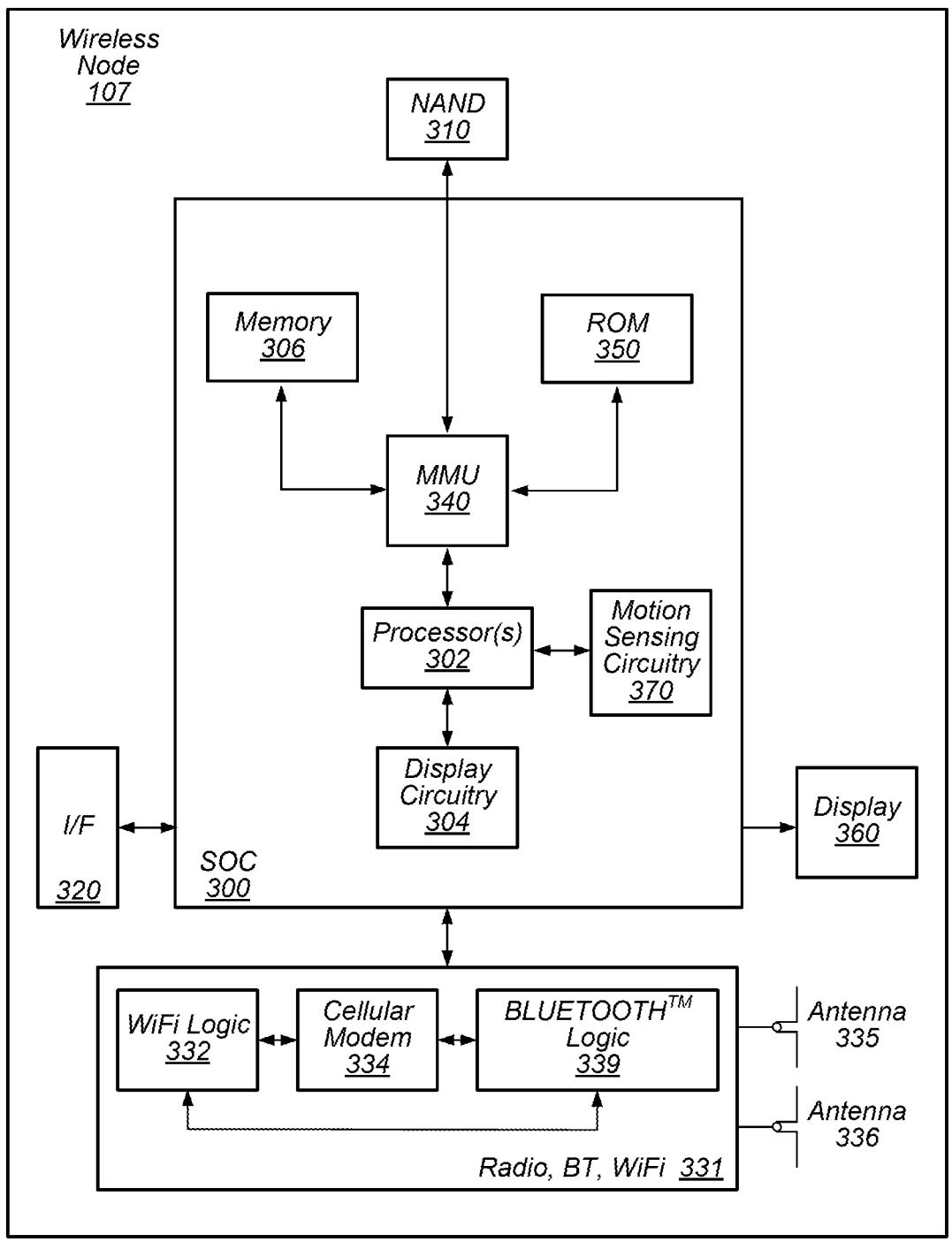
FIG. 3B illustrates an example simplified block diagram of a wireless node, according to some embodiments.

FIG. 3B—Wireless Node Block Diagram

FIG. 3B illustrates one possible block diagram of a wireless node 107, which may be one possible exemplary implementation of the device 100 illustrated in FIG. 1B. As shown, the wireless node 107 may include a system on chip (SOC) 300, which may include portions for various purposes. For example, as shown, the SOC 300 may include processor(s) 302 which may execute program instructions for the wireless node 107, and display circuitry 304 which may perform graphics processing and provide display signals to the display 360. The SOC 300 may also include motion sensing circuitry 370 which may detect motion of the wireless node 107, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the wireless node 107. For example, the wireless node 107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The wireless node 107 may include at least one antenna, and in some embodiments, multiple antennas 335 and 336, for performing wireless communication with base stations and/or other devices. For example, the wireless node 107 may use antennas 33 and 336 to perform the wireless communication. As noted above, the wireless node 107 may in some embodiments be configured to communicate wirelessly using a plurality of wireless communication standards or radio access technologies (RATs).

The wireless communication circuitry 331 may include Wi-Fi Logic 332, a Cellular Modem 334, and Bluetooth Logic 339. The Wi-Fi Logic 332 is for enabling the wireless node 107 to perform Wi-Fi communications, e.g., on an 802.11 network. The Bluetooth Logic 339 is for enabling the wireless node 107 to perform Bluetooth communications. The cellular modem 334 may be capable of performing cellular communication according to one or more cellular communication technologies. Some or all components of the wireless communication circuitry 331 may be used for ranging communications, e.g., using WLAN, Bluetooth, and/or cellular communications.

As described herein, wireless node 107 may include hardware and software components for implementing embodiments of this disclosure. For example, one or more components of the wireless communication circuitry 331 (e.g., Wi-Fi Logic 332) of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit). For example, in some embodiments, as further described below, wireless node 107 may be configured to receive, at a first time and at a first layer, a data packet and an associated latency requirement of the data packet from an upper layer. The first layer may determine based, at least in part, on the associated latency requirement, a target transmission time. The target transmission time may be a sum of a queuing delay, an expected transmit completion time, and the first time. The data packet may be queued (or scheduled for transmission) (at a second layer of the wireless station) based, at least in part, on the target transmission time and an access category assigned to the data packet. The data packet may be transmitted (or scheduled for transmission) from the queue according to the target transmission time. In some embodiments, the target transmission time may be defined as a time when the data packet must be delivered over the access medium to meet the associated latency requirement. In some embodiments, the expected transmit completion time may be a sum of an average contention time for the access category assigned to the data packet and estimated airtime. In some embodiments, the estimated airtime may be a product of packet size of the data and a recent physical layer rate. In some embodiments, the recent physical layer rate may be a weighted linear combination of a most recently assigned physical layer rate and a moving average for previously assigned physical layer rates.

Target Transmission Time Based Transmit Scheduling

In some implementations, an application, e.g., executing on a wireless device, that communicates with other wireless devices may generate data to be transmitted to the other wireless devices. The data may be packetized at a network layer of the wireless device and passed to a data link layer driver through a data queuing architecture. The data link layer may further encapsulate the data into containers defined by protocols native to a certain communication technology (e.g., a particular radio access technology (RAT)) and may perform transmissions. Various applications may have a variety of traffic latency requirements in order to work well, e.g., a video call application may have a very low latency requirement as compared to an email application. The queueing architecture and transmissions performed by the data link layer may often have limitations on traffic differentiation and may not be able to meet a variety of latency requirements. For example, an 802.11 data link layer may use the concept of 4 major access categories, namely, best effort (BE), background (BK), video (VI), and voice (VO). The 802.11 data link layer may map higher layer requirements into one of those 4 access categories.

In addition, since each frame transmitted by the 802.11 data link layer may include a significant amount of overhead, such as radio level headers, medium access control (MAC) frame fields, interframe spacing and acknowledgment of transmitted frames, the 802.11 data link layer may perform MAC protocol data unit (MPDU) aggregation to group several data frames into one large frame. Additionally, the 802.11 data link layer may aggregate MPDUs (AMPDUs) by joining multiple MPDU sub frames with a single leading physical (PHY) header.

In some implementations, the 802.11 data link layer may perform AMPDU aggregation and channel access independently on the access categories in order to meet traffic differentiations and priorities. However, having to converge various applications' latency requirements into 4 access categories may pose severe limitations to their performance. For example, one of the largest limitations to meeting a tight latency/jitter requirement is "head of line" (HOL) blocking. In current 802.11 traffic differentiation architectures, when low latency traffic hides behind moderate latency traffic of the same access category, then the lower latency requirements cannot be guaranteed, e.g., due to the moderate latency traffic being queued ahead of the low latency traffic.

Embodiments described herein provide mechanisms for a data link layer of a wireless station, such as wireless station 106, to determine a target transmission time (TTT) for data packets. The target transmission time may be defined as the instance in time when a data packet must complete transmission over a wireless medium in order to meet an associated latency/jitter requirement. In some embodiments, the associated latency/jitter requirement may be determined/specified by an application (e.g., at an application layer) and passed (transmitted) to the data link layer. In some embodiments, when packets are queued in their respective access category queues, e.g., for MPDU sequencing and aggregation, a position for a packet in the per access category queue may be decided by target transmission time. Such a scheme may prevent "head of line" blocking. In some embodiments, each time a new frame is to be scheduled for medium contention by a data link layer, such as an 802.11 MAC layer, considerations may be made based on a sum of "how close a certain packet is from its TTT" and an "estimated transmit completion time" (ETCT) for the packet. The ETCT may be defined as a statistical value derived from recent transmission history. For example, if a packet in access category best effort (AC_BE) is closer to its TTT than any other packet, it will be scheduled for contention and transmission. In some embodiments, "how close a certain packet is from its TTT" (e.g., $\Delta TTT$) may be defined as a difference between a current time and TTT, e.g.:

$$\Delta TTT = (TTT - t_c) \quad (1)$$

where $t_c$ may be defined as the current time. In some embodiments, ETCT may be calculated using an estimated contention time and an estimated airtime. In some embodiments, recent physical layer (PHY) rates can be derived from receiver address (RA) or recent resource unit (RU) allocations by an access point (AP) serving the wireless station, e.g.:

$$ETCT = AVG_{VCT}(AC_i) + Est\_AT \quad (2)$$

$$Est\_AT = PL_j \times PR_k \quad (3)$$

where, $AVG_{CT}(AC_i)$ may be defined as an average contention time for an access category, $Est\_AT$ may be defined as estimated airtime, $PL_j$ may be defined as available packet length, and $PR_k$ may be defined as recent physical layer rate. In some embodiments, the estimated airtime, $Est\_AT$ may be calculated as a weighted linear combination of a most recently assigned PHY rate and a moving average for previously assigned PHY rates, e.g.:

$$Est_{AT} = P_{size}(\alpha R_{prev} + (1-\alpha) R_{avg}) \text{ where } 0 < \alpha \leq 1 \quad (4)$$

where, $P_{size}$ is the size of the data packet to be transmitted.

Figure 4:
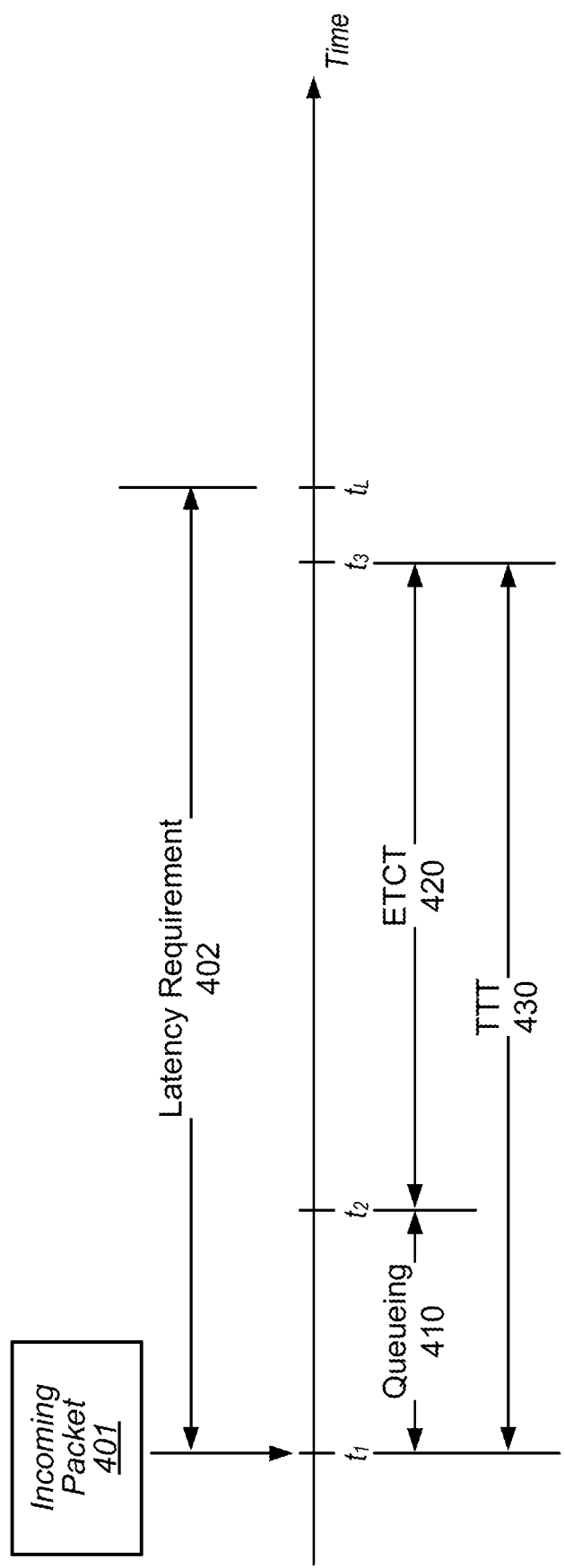
FIG. 4 illustrates an example of a transmission timeline of a data packet using a target transmission time, according to some embodiments.

FIG. 4 illustrates an example of a transmission timeline of a data packet using a target transmission time, according to some embodiments. As shown, at time $t_1$, an incoming data packet 401 may be received by a data link layer of a wireless station, such as wireless station 106. The incoming data packet 401 may include a latency requirement 402. In other words, incoming data packet 401 may include an indication of a requirement that the incoming data packet 401 be delivered to a receiver by time $t_L$, as shown. In some embodiments, the data link layer may have (or encounter) a queueing delay 410 (e.g., a difference in time between $t_2$ and $t_1$). Thus, the target transmission time, TTT 430, may be shown as a sum of the queueing delay 410 and ETCT 420. In some embodiments, the incoming data packet 401 may be queued in a buffer based, at least in part, on TTT 430. In some embodiments, incoming data packet 401's queue position in a buffer may be based, at least in part, on TTT 430. In some embodiments, a target transmission time, such as TTT 430, may be specified such that an associated ETCT, such as ETCT 420, occurs prior to violation of a latency requirement, e.g.:

$$t_{TSF}+t_{q(P)}+ETCT \leq t_{TSF}+L(P) \quad (5a)$$

$$t_{q(P)}+ETCT \leq L(P) \quad (5b)$$

$$t_{q(P)} \leq L(P)-ETCT \quad (5c)$$

where, $t_{q(P)}$ may be a queuing delay for a packet, P, L(P) may be a latency requirement for the packet, P, and $t_{TSF}$ may be a time at which the data packet is received at the link layer (e.g., based on a value of a timing synchronization function (TSF)).

In some embodiments, a host-side network driver may responsible for bridging host L3 datapath into an L2 datapath architecture. For example, a WLAN host driver may queue MAC service data units (MSDUs) into a WLAN device firmware (FW) queues. WLAN device FW may be responsible for encapsulating MSDUs into aggregated (AM-SDUs). MPDU encapsulations and MPDU sequence number assignments may be done after AMSDU encapsulations.

Figure 5:
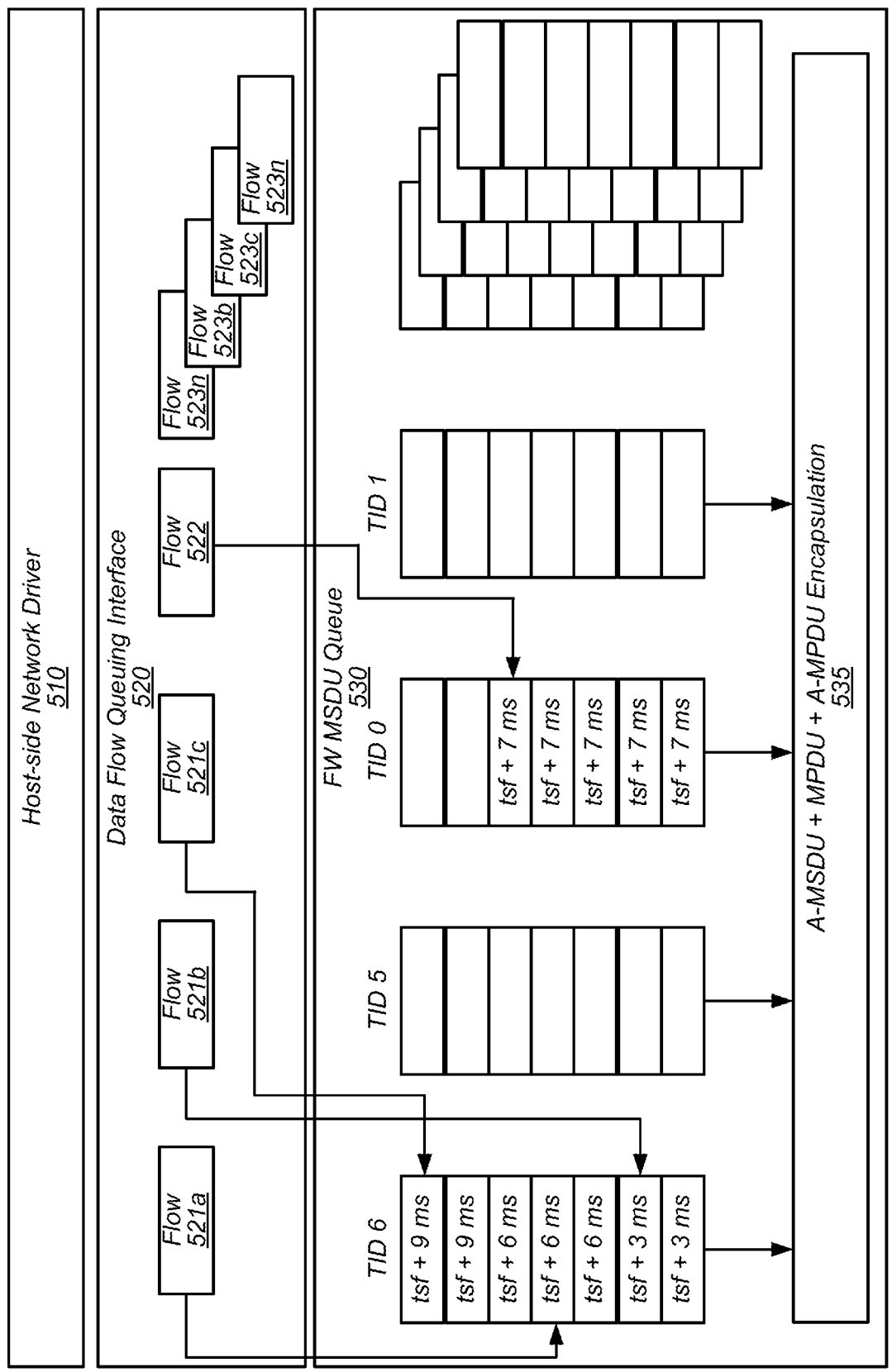
FIG. 5 illustrates an example of queueing data packets based on ETCT, according to some embodiments.

FIG. 5 illustrates an example of queueing data packets based on ETCT, according to some embodiments. As shown, a host-side network driver 510 (e.g., a first layer) of a wireless device, such as client station 106, may interface with a firmware (FW) MSDU queue 530 via data flow queuing interface 520. FW MSDU queue 530 may include AMSDU, MPDU, and AMPDU encapsulation driver 535. Flows 521a-c, received from an application layer of the wireless device) may map into queue TID6 while flow 522 (also received from the application layer) may map into queue TID 0, e.g., as per differentiated services code point (DSCP) tagging performed at IP layers of the wireless device. In addition, flows 523a-n may be awaiting queueing and queues TID 5 and TID 1 may be empty. The application layer may pass information on each flow to the host-side network driver 510 based on user activity. In some embodiments, the information may contain latency and/or jitter requirements for each flow, e.g., to ensure optimized user experience.

The host-side network driver 510 may determine a TTT (target transmit time) for each MSDU and pass a descriptor carrying MSDU address and it's TTT to the FW MSDU queue 530. The FW MSDU queue 530 may organize the queues (e.g., TID 0, 1, 5, and 6) in the form of ordered linked lists where a new MSDU (e.g., flow) can be inserted in between existing MSDUs according to the new MSDU's TTT (e.g., as determined by the host-side network driver 510). In some embodiments, the FW MSDU queue 530 may also maintain pointers to a most recent packet for each flow, e.g., to improve and/or speed up a search and insert operation for a new MSDU. As a result, a head of the linked-list in each queue may be expected to be an MSDU whose TTT is closest to current timing synchronization function (TSF) value. In some embodiments, a packet scheduling algorithm may give priority to packets according to nearest TTT and may perform encapsulations and MPDU sequence number assignments according to the order in the linked list. For example, as shown, packet scheduling (and/or transmission) will be performed in order of the first 2 packets of queue TID 6 (e.g., tsf+3 ms), then the next 3 packets of queue TID 6 (e.g., tsf+6 ms), then the 5 packets of queue TID 0 (e.g., tsf+7 ms), and then the final 2 packets of queue TID 6 (e.g., tsf+9 ms).

In some embodiments, upon expiration of a packet's (or flow's) TTT, the packet may be removed from a transmission queue (e.g., if still under software control) and returned back to the host-side network driver. In some embodiments, an error indication may be added (or appended) to the packet. Additionally, if expiration is caused by a transmit failure, a TTT expired packet's retransmission attempts may be cancelled, e.g., to prevent cascading effect on remaining packets. In other words, if a packet's TTT expiration is caused by a transmission failure, retransmission of the packet may be cancelled to avoid cause other packets to miss their TTT.

Figure 6:
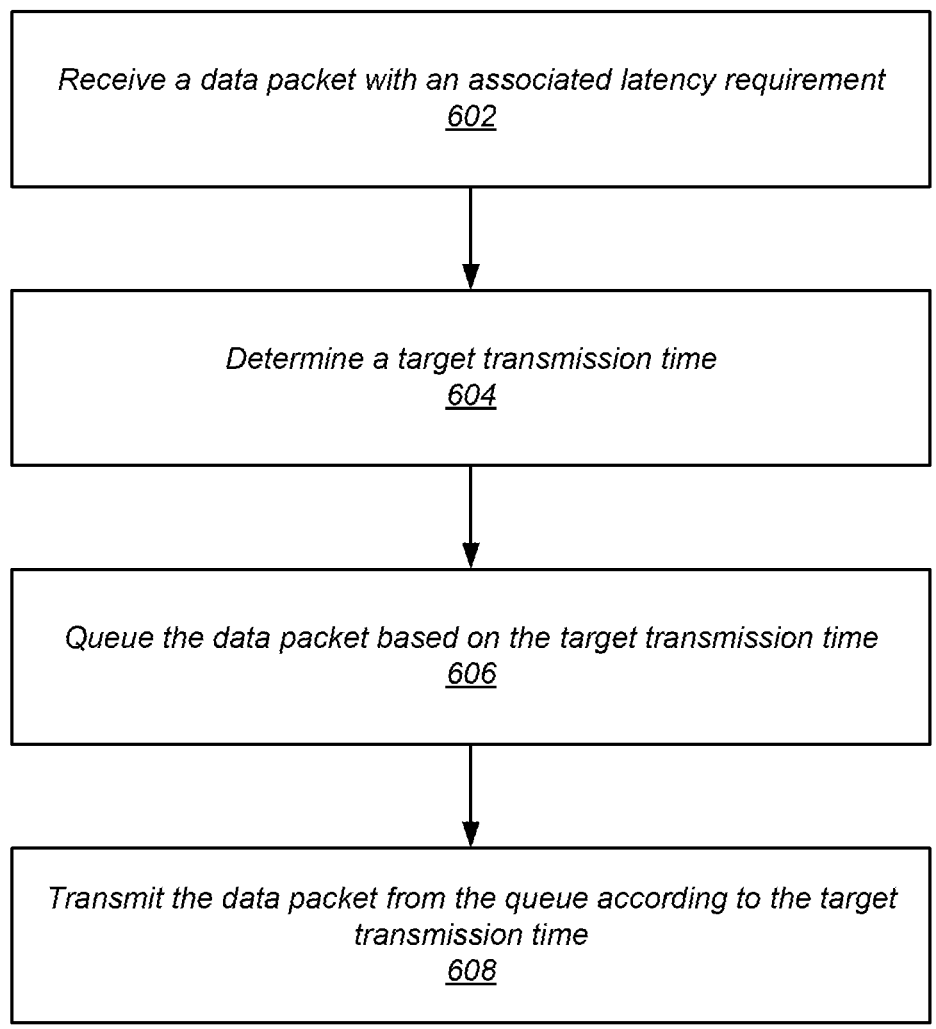
FIG. 6 illustrates a block diagram of an example of a method for queueing data packets based on a target transmission time, according to some embodiments.

FIG. 6 illustrates a block diagram of an example of a method for queueing data packets based on a target transmission time, according to some embodiments. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, a data packet may be received at a layer of a wireless device, such as client station 106, at a first time. For example, the data packet may be received at a network layer of a network protocol stack of the wireless device. In some embodiments, the first time may be determined based (at least in part) on a timing synchronization function (TSF) value. The data packet may be generated by an application executing on the wireless device, e.g., on an upper and/or higher layer of the network protocol stack of the wireless device, such as an application layer of the network protocol stack. In some embodiments, the application may be executing at the application layer of the wireless device. In some embodiments, the application may include (and/or append) a latency requirement associated with the data packet.

At 604, a target transmission time (TTT) may be determined by the first layer (e.g., a driver executing at and/or within the first layer). For example, the TTT may be determined by the network layer (e.g., a driver executing at and/or within the network layer) of the wireless device. The target transmission time may be based, at least in part, on the latency requirement associated with the data packet. In some embodiments, the target transmission time may be a sum of a queuing delay, an expected transmit (or transmission) completion time (ETCT), and the first time (e.g., the time the data packet was received by the first layer). In some embodiments, the target transmission time may be defined as a time when the data packet must be delivered over an access medium to meet the associated latency requirement. In some embodiments, the expected transmit (or transmission) completion time may be a sum of an average contention time for an access category assigned to the data packet and estimated airtime. In some embodiments, the estimated airtime may be a product of packet size of the data and a recent physical layer rate. In some embodiments, the recent physical layer rate may be a weighted linear combination of a most recently assigned physical layer rate and a moving average for previously assigned physical layer rates.

At 606, the data packet may be queued (e.g., for transmission) based (at least in part) on the target transmission time. The queue may at a second layer of the wireless device. For example, the data packet may be queued at a data link layer of the network protocol stack of the wireless device. In some embodiments, queueing of the data packet may also be based, at least in part, on an access category assigned to the data packet. In some embodiment, queueing the data packet may include inserting the data packet into an ordered linked list of queued data packets according to the data packet's target transmission time, e.g., as compared to target transmission times of queued data packets (e.g., data packets previously placed in the queue). In some embodiments, ordering within the queue may be based on a target transmission times. In some embodiments, data encapsulation and medium access control (MAC) protocol data unit (MPDU) sequence number assignments may be based on the ordering.

At 608, the data packet may be transmitted from the queue based on (and/or according to and/or in accordance with) the target transmission time. In other words, the data packet may be transmitted such that the data packet may be received by the target transmission time, thereby meeting the latency requirement associated with the data packet. In some embodiments, upon determining that the target transmission time for the data packet has expired (e.g., the data packet will not be delivered until after the target transmission time), the data packet may be returned to the first layer with an appended error indication. In some embodiments, upon determining that transmission of the data packet has failed and that the target transmission time for the data packet has expired due to the transmission failure, retransmission attempts for the data packet may be cancelled. In some embodiments, cancellation of the retransmission attempts may prevent missing target transmission times associated with data packets queued behind the data packet.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least one antenna;
at least one radio communicatively coupled to the antenna and configured to perform wireless communications according to at least one radio access technology (RAT);
at least one processor communicatively coupled to the at least one radio, wherein the wireless device is configured to perform voice and/or data communications;
wherein the at least one processor is configured to cause the wireless device to:
receive, at a first time and at a first layer of one or more layers of a protocol stack of the wireless device, a data packet and an associated latency requirement of the data packet from an upper layer of the one or more layers;
determine, at the first layer and based at least in part on the associated latency requirement, a target transmission time, wherein the target transmission time comprises a sum of a queuing delay, an average contention time for an access category assigned to the data packet, an estimated airtime, and the first time;
queue, at a second layer of the one or more layers, the data packet based, at least in part, on the target transmission time and an access category assigned to the data packet, wherein the data packet is received from the first layer; and
transmit, from the queue, the data packet according to the target transmission time.

2. The wireless device of claim 1,
wherein the target transmission time comprises a time by which the data packet must be delivered over an access medium to meet the associated latency requirement.

3. The wireless device of claim 1,
wherein the sum of the average contention time for the access category assigned to the data packet and the estimated airtime defines an expected transmit completion time.

4. The wireless device of claim 3,
wherein the estimated airtime comprises a product of packet size of the data and a recent physical layer rate.

5. The wireless device of claim 4,
wherein the recent physical layer rate comprises a weighted linear combination of a most recently assigned physical layer rate and a moving average for previously assigned physical layer rates.

6. The wireless device of claim 1,
wherein, to queue the data packet, the at least one processor is further configured to cause the wireless device to insert the data packet into an ordered linked list of queued data packets according to the target transmission time associated with the data packet.

7. The wireless device of claim 1,
wherein ordering within a queue is based on target transmission time.

8. The wireless device of claim 7,
wherein data encapsulation and medium access control (MAC) protocol data unit (MPDU) sequence number assignments are based on the ordering.

9. The wireless device of claim 1,
wherein the at least one processor is further configured to cause the wireless device to:
determine, at the second layer of the one or more layers, that the target transmission time associated with the data packet has expired; and
in response to the determining, return the data packet from the second layer to the first layer with an appended error indication.

10. An apparatus, comprising:
a memory; and
at least one processor in communication with the memory, wherein the at least one processor is configured to:
receive, at a first time and at a first layer of one or more layers of a network protocol stack of a wireless device, a data packet and an associated latency requirement of the data packet from an application layer of the one or more layers;
determine, at the first layer and based at least in part on the associated latency requirement, a target transmission time, wherein the target transmission time comprises a sum of a queuing delay, an average contention time for an access category assigned to the data packet, an estimated airtime, and the first time;
queue, at a second layer of the one or more layers, the data packet based, at least in part, on the target transmission time and an access category assigned to the data packet, wherein the data packet is received from the first layer.

11. The apparatus of claim 10,
wherein the at least one processor is further configured to:
generate instructions to cause transmission of the data packet from the queue in accordance with the target transmission time.

12. The apparatus of claim 10,
wherein the at least one processor is further configured to:
determining that a transmission of the data packet has failed; and
upon determining that the target transmission time for the data packet has expired, cancel a retransmission attempt for the data packet.

13. The apparatus of claim 12,
wherein cancellation of the retransmission attempt prevents missing a target transmission time associated with an additional data packet queued behind the data packet.

14. The apparatus of claim 10,
wherein the first time is determined based on a timing synchronization function (TSF) value.

15. The apparatus of claim 10,
wherein the sum of the average contention time for the access category assigned to the data packet and the estimated airtime defines an expected transmit completion time.

16. The apparatus of claim 15,
wherein the estimated airtime comprises a product of a packet size of the data packet and a recent physical layer rate.

17. A non-transitory computer readable memory medium storing program instructions executable by processing circuitry of a wireless device to:
receive, at a first time and at a first network layer of one or more network layers of a network protocol stack of the wireless device, a data packet and an associated latency requirement of the data packet from a higher layer of the one or more layers;
determine, at the first layer and based at least in part on the associated latency requirement, a target transmission time, wherein the target transmission time comprises a sum of a queuing delay, an average contention time for an access category assigned to the data packet, an estimated airtime, and the first time;
queue, at a second layer of the one or more layers, the data packet based, at least in part, on the target transmission time and an access category assigned to the data packet, wherein the data packet is received from the first layer; and
transmit, from the queue, the data packet in accordance with the target transmission time.

18. The non-transitory computer readable memory medium of claim 17,
wherein the target transmission time comprises a time by which the data packet must be delivered over an access medium to satisfy the associated latency requirement.

19. The non-transitory computer readable memory medium of claim 17,
wherein the sum of the average contention time for the access category assigned to the data packet and the estimated airtime defines an expected transmit completion time.

20. The non-transitory computer readable memory medium of claim 19,
wherein the estimated airtime comprises a product of a packet size of the data packet and a recent physical layer rate.

* * * * *